United States Patent
Fodor et al.

(10) Patent No.: US 9,198,211 B2
(45) Date of Patent: Nov. 24, 2015

(54) METHODS AND ARRANGEMENTS IN A CELLULAR COMMUNICATION NETWORK

(75) Inventors: Gabor Fodor, Hässelby (SE); Tomas Hedberg, Stockholm (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 940 days.

(21) Appl. No.: 13/008,575

(22) Filed: Jan. 18, 2011

(65) Prior Publication Data

US 2011/0188485 A1 Aug. 4, 2011

(30) Foreign Application Priority Data

Feb. 2, 2010 (SE) .................. PCT/SE2010/050125

(51) Int. Cl.
| | |
|---|---|
| *H04W 84/12* | (2009.01) |
| *H04W 80/04* | (2009.01) |
| *H04W 84/18* | (2009.01) |
| *H04W 88/06* | (2009.01) |
| *H04W 74/08* | (2009.01) |
| *H04W 76/02* | (2009.01) |
| *H04W 16/14* | (2009.01) |

(52) U.S. Cl.
CPC ............ *H04W 76/023* (2013.01); *H04W 16/14* (2013.01); *H04W 84/18* (2013.01); *H04W 88/06* (2013.01)

(58) Field of Classification Search
CPC ..... H04B 7/2606; H04B 7/155; H04W 88/04; H04W 16/26; H04W 84/047
See application file for complete search history.

(56) References Cited

U.S. PATENT DOCUMENTS

| | | | |
|---|---|---|---|
| 6,532,368 B1* | 3/2003 | Hild et al. ............. | 455/515 |
| 6,879,574 B2* | 4/2005 | Naghian et al. ............. | 370/338 |
| 7,406,299 B1* | 7/2008 | Hudson ............. | 455/103 |
| 7,471,626 B2* | 12/2008 | Naghian et al. ............. | 370/229 |
| 7,599,665 B2* | 10/2009 | Sinivaara ............. | 455/67.16 |
| 7,606,587 B2* | 10/2009 | Xu et al. ............. | 455/502 |
| 7,898,993 B2* | 3/2011 | Dawson et al. ............. | 370/310 |
| 8,027,282 B2* | 9/2011 | Boehnke et al. ............. | 370/311 |
| 8,233,462 B2* | 7/2012 | Walton et al. ............. | 370/338 |
| 8,320,414 B2* | 11/2012 | Dawson et al. ............. | 370/539 |
| 2003/0026433 A1* | 2/2003 | Matt ............. | 380/278 |
| 2004/0045027 A1* | 3/2004 | Takamura et al. ............. | 725/78 |
| 2004/0179502 A1* | 9/2004 | Naghian et al. ............. | 370/338 |
| 2004/0203787 A1* | 10/2004 | Naghian ............. | 455/437 |
| 2005/0002407 A1* | 1/2005 | Shaheen et al. ............. | 370/401 |
| 2005/0099943 A1* | 5/2005 | Naghian et al. ............. | 370/229 |
| 2005/0153725 A1* | 7/2005 | Naghian et al. ............. | 455/520 |
| 2005/0193106 A1* | 9/2005 | Desai et al. ............. | 709/223 |

(Continued)

OTHER PUBLICATIONS

International Search Report, PCT Application No. PCT/SE2010/050125, Dec. 6, 2010.

(Continued)

*Primary Examiner* — Hassan Phillips
*Assistant Examiner* — Prenell Jones
(74) *Attorney, Agent, or Firm* — Myers Bigel Sibley & Sajovec, PA

(57) ABSTRACT

The present invention relates to methods and arrangements for resolving radio resource conflicts occurring in radio networks supporting both local ad-hoc communication and cellular communication. The conflicts are resolved by informing the cellular network about radio resource management restrictions due to the local ad-hoc communication needs and resources that are reserved for local ad-hoc communications.

28 Claims, 10 Drawing Sheets

(56) References Cited

U.S. PATENT DOCUMENTS

| | | | |
|---|---|---|---|
| 2005/0239438 A1* | 10/2005 | Naghian | 455/410 |
| 2006/0040670 A1* | 2/2006 | Li et al. | 455/445 |
| 2006/0098677 A1* | 5/2006 | Ozer | 370/437 |
| 2006/0194546 A1* | 8/2006 | Gunnarsson et al. | 455/69 |
| 2007/0115817 A1* | 5/2007 | Gupta et al. | 370/230 |
| 2007/0159388 A1* | 7/2007 | Allison et al. | 342/357.09 |
| 2008/0130728 A1* | 6/2008 | Burgan et al. | 375/222 |
| 2009/0004972 A1 | 1/2009 | Wang et al. | |
| 2009/0046632 A1* | 2/2009 | Nanda et al. | 370/328 |
| 2009/0047931 A1* | 2/2009 | Nanda et al. | 455/411 |
| 2009/0047938 A1* | 2/2009 | Khedher et al. | 455/416 |
| 2009/0073943 A1* | 3/2009 | Krishnaswamy et al. | 370/338 |
| 2009/0262704 A1* | 10/2009 | Khetawat et al. | 370/331 |
| 2009/0305671 A1* | 12/2009 | Luft et al. | 455/411 |
| 2010/0136987 A1* | 6/2010 | Kim et al. | 455/450 |
| 2010/0177711 A1* | 7/2010 | Gum | 370/329 |
| 2010/0195626 A1* | 8/2010 | Horn et al. | 370/336 |
| 2010/0240312 A1* | 9/2010 | Peng et al. | 455/63.1 |
| 2010/0248643 A1* | 9/2010 | Aaron et al. | 455/68 |
| 2010/0261469 A1* | 10/2010 | Ribeiro et al. | 455/423 |
| 2010/0279672 A1* | 11/2010 | Koskela et al. | 455/418 |
| 2011/0237231 A1* | 9/2011 | Horneman et al. | 455/414.1 |
| 2012/0005304 A1* | 1/2012 | Guo et al. | 709/217 |
| 2012/0051315 A1* | 3/2012 | Wang et al. | 370/329 |
| 2012/0184306 A1* | 7/2012 | Zou et al. | 455/458 |
| 2012/0243431 A1* | 9/2012 | Chen et al. | 370/252 |
| 2012/0300662 A1* | 11/2012 | Wang et al. | 370/252 |
| 2013/0136013 A1* | 5/2013 | Kneckt et al. | 370/252 |

OTHER PUBLICATIONS

Written Opinion of the international Searching Authority, PCT Application No. PCT/SE2010/050125, Dec. 6, 2010.

Dimitrakopoulos et al. "Cognitive Radio, Spectrum and Radio Resource Management", Internet Citation, Jan. 1, 2004, pp. 1-69, XP002557569, Retrieved from the Internet: URL:http://www.wireless-world-research.org/fileadmin/sites/default/files/about_the_forum/WG/WG6/White%20Paper/WG6_WP4.pdf.

* cited by examiner

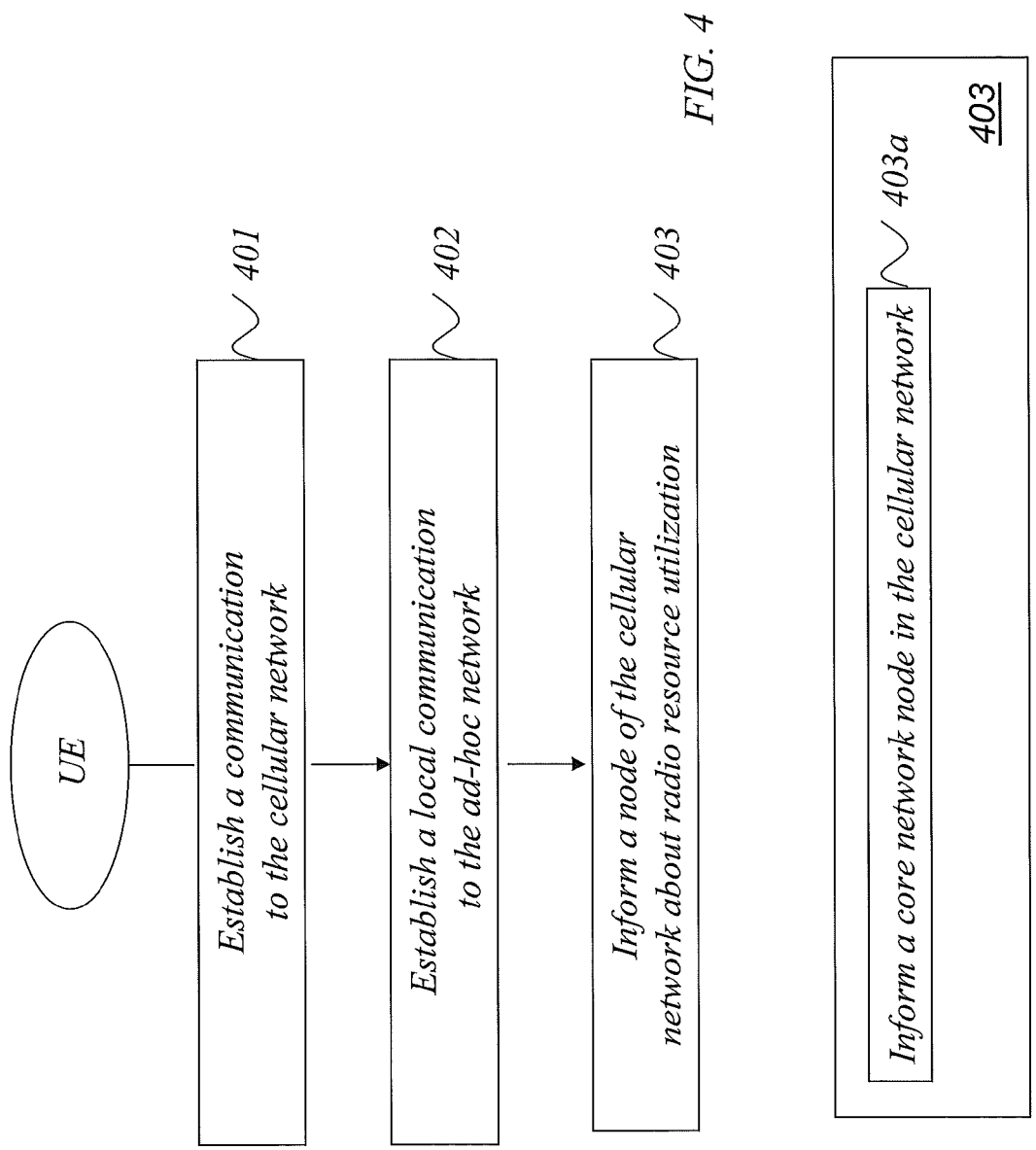

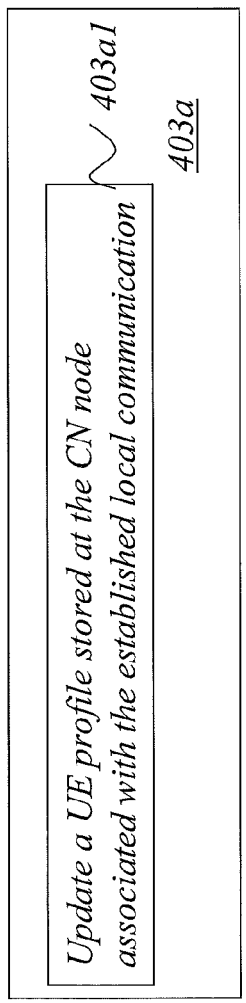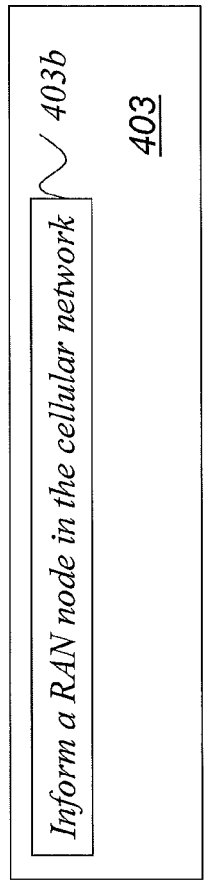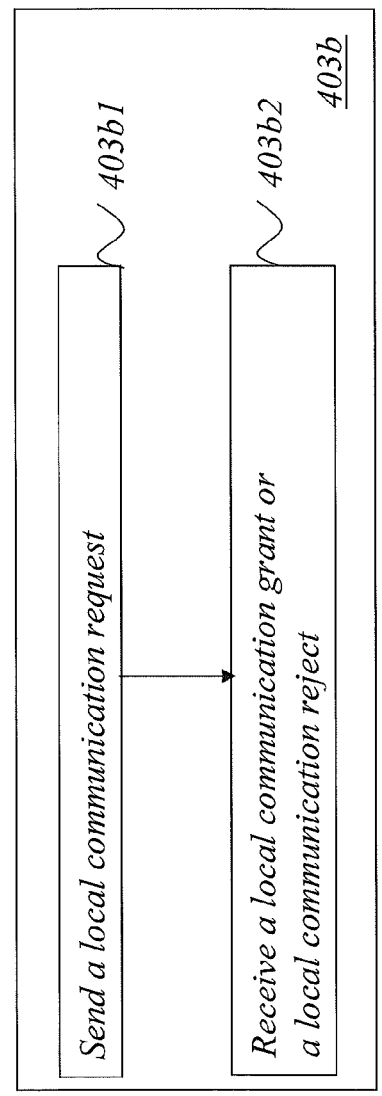

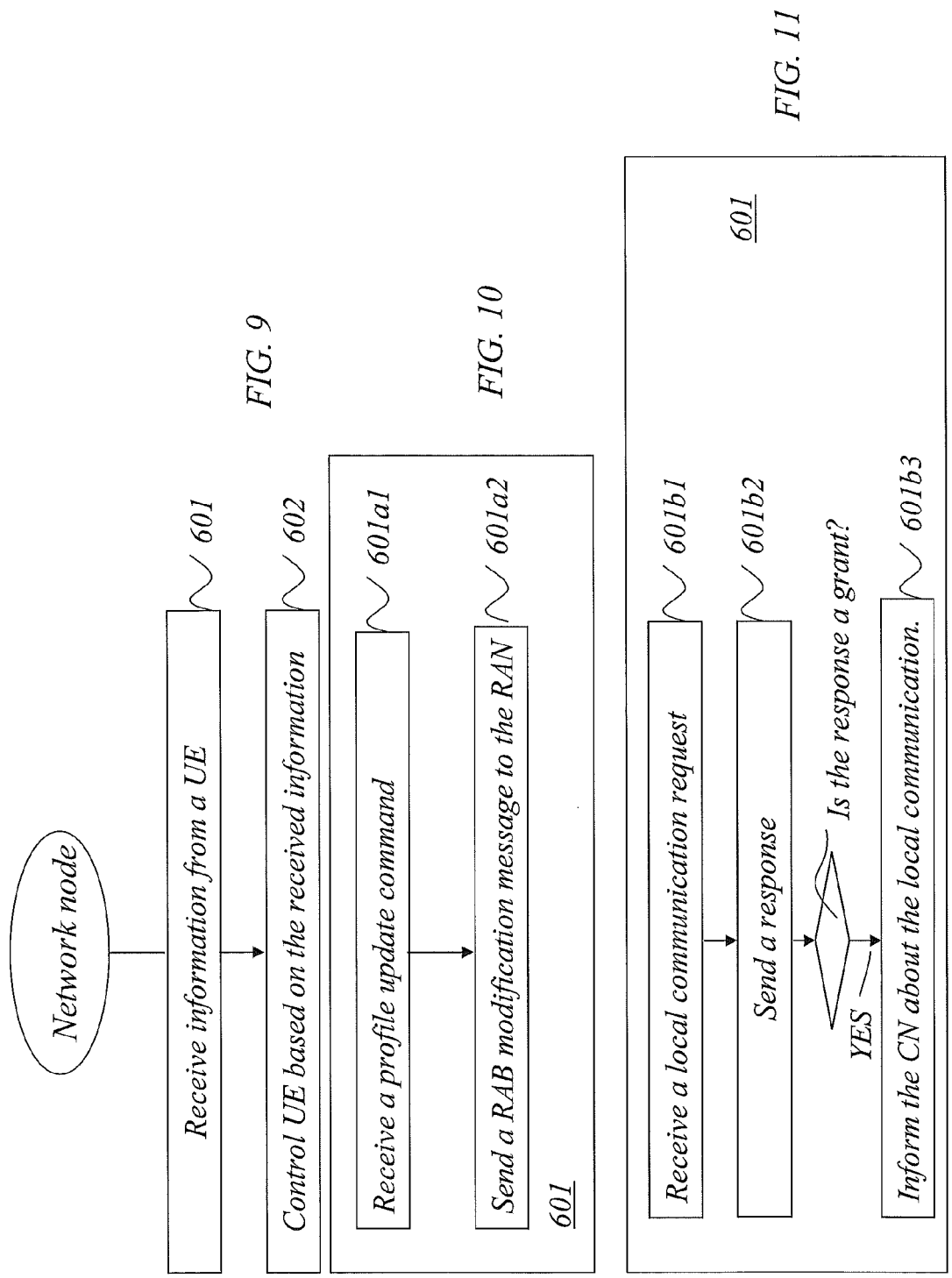

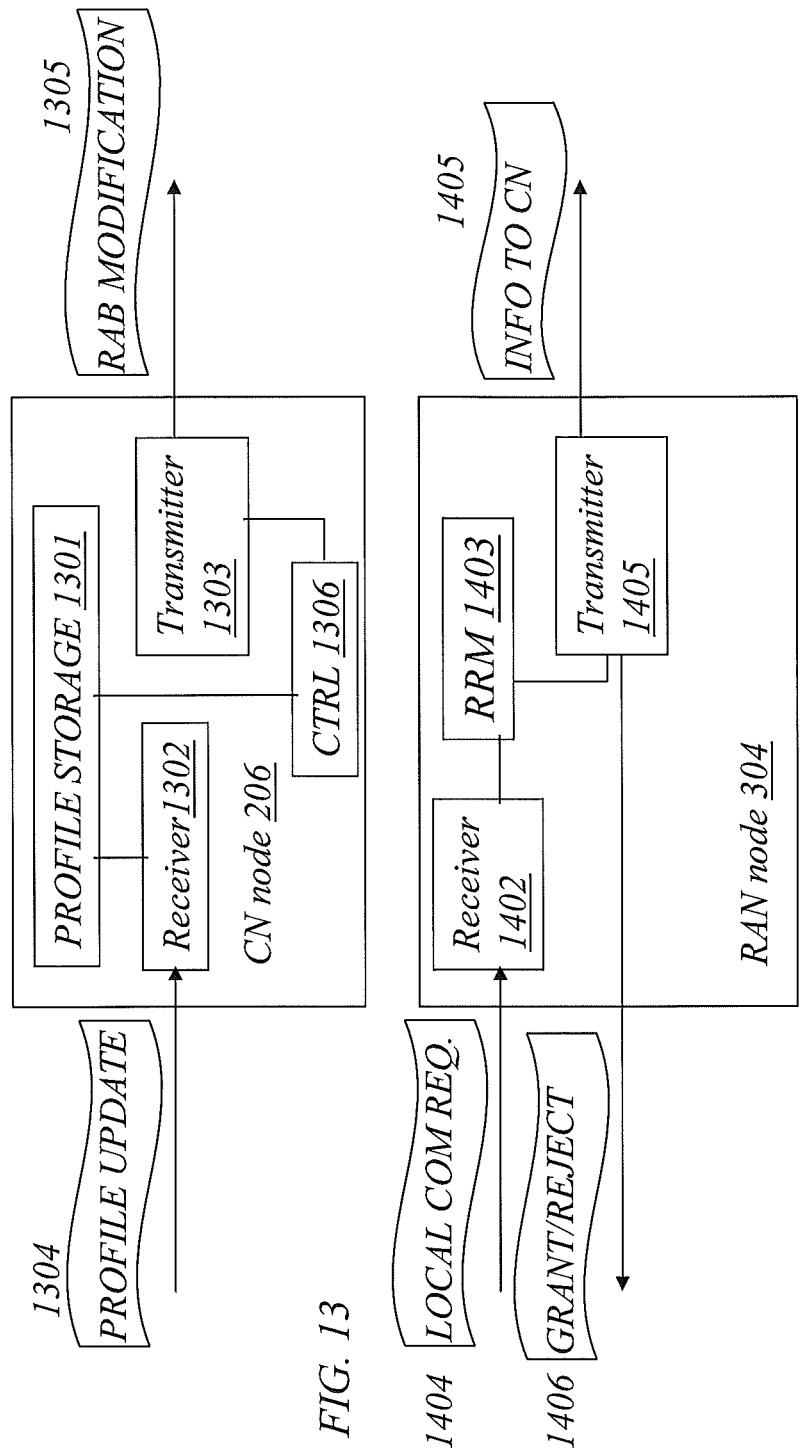

METHODS AND ARRANGEMENTS IN A CELLULAR COMMUNICATION NETWORK

RELATED APPLICATIONS

This is a 35 USC §111 application claiming priority under 35 USC §119 to PCT International Application No. PCT/SE2010/050125, filed on Feb. 2, 2010, the disclosure of which is incorporated by reference herein in its entirety.

TECHNICAL FIELD

The present invention relates to methods and arrangements in a cellular communication network using a radio access technology capable of establishing both local ad-hoc and cellular communication sessions.

BACKGROUND

Most user equipments (UE) in wireless communications systems today, are equipped with multiple radio interfaces such that they are configured to operate over multiple radio access technologies (RATs), such as GSM, 3G and LTE. The existing UEs equipped with multiple radio interfaces are confined to use only one of the available RATs at a given point in time, even if several RATs are available and the UE runs several applications simultaneously. That is, true "multi-homing" using several RATs simultaneously is currently not supported by the commercially available cellular UEs. In fact, this limitation is not only due to UE limitations, but also because true multi-homing support would require new solutions in the multi-radio protocols as well. Therefore, it is expected that at least a subset of future UEs continues to operate in a "one RAT a time" mode.

Local ad-hoc networks, also referred to as wireless self-organizing networks, consist in their simplest forms of independent wireless nodes that dynamically form connections with each other to create a network. Self-organizing or ad-hoc networks have no central control and no dependence upon a fixed infrastructure. Today, ad-hoc networking is facilitated by, for example, BlueTooth, which is included as standard in many UEs, including phones, laptops, personal digital assistants (PDAs), computers and home electronics such as video cameras.

In the future, cellular RATs and notably LTE networks will support ad-hoc networking allowing devices equipped with a 3GPP LTE interface to form ad-hoc networks for local communication. Such scenarios can be in the wireless home or office or in public "hot spot" areas, e.g. air ports, libraries, health care centers, public administration buildings, etc.

When the resources of the cellular network also are used for local communication with ad-hoc peers, resource conflicts between the cellular network and the ad-hoc communication may occur.

A solution to this conflict may be to allocate some of the resources (e.g. certain frequency bands) for local ad-hoc communication and other resources for communication with the cellular network.

A disadvantage with such a solution is that the resources may not be utilized efficiently since the need for local ad-hoc communication may vary over time.

SUMMARY

Thus an object of the present invention is to achieve a more resource efficient solution.

This is achieved by informing the cellular network consisting of a core network and one or more radio access networks about radio resource management restrictions in the cellular network due to the ad-hoc communication needs and resources that are reserved for ad-hoc communications. When the cellular network is aware of this information it can manage the cellular radio resources to avoid conflicts with the resources used for the local ad-hoc communication session.

According to a first aspect of the present invention a method in a UE is provided. The UE comprises at least one radio access communication interface supporting cellular and local ad-hoc communication. In the method, a local communication to the ad-hoc network is established, and information about radio resource utilization resulting in resource restrictions for cellular communication due to the local ad-hoc communication is sent via a cellular connection to a node of the cellular network.

According to an embodiment of the present invention, the UE comprises at least a first communication interface for a first cellular network configured according to a first RAT and a second communication interface for a second cellular network configured according to a second RAT, wherein only one of the first and second communication interfaces can be used at one point of time. In this embodiment, the information about radio resource utilization resulting in resource restrictions due to the local ad-hoc communication comprises recommendations that the UE should not be handed over to certain radio access technologies.

According to a second aspect of the present invention a method in a network node is provided. The network node controls cellular radio resources of UEs in a cellular network at least configured to operate according to one radio access technology supporting local ad-hoc communication. In the method, information from a UE is received about radio resource utilization resulting in resource restrictions due to a local communication which the UE intends to be involved in, and the cellular radio resources are controlled based on the received information.

According to a third aspect of the present invention a UE is provided. The UE comprises at least one radio access communication interface supporting cellular and local ad-hoc communication. The at least one radio access communication interface is configured to establish a local communication to the ad-hoc network. Further, the UE comprises an information unit configured to send, to a node of the cellular network, information about radio resource utilization resulting in radio resource restrictions for cellular communication due to the local ad-hoc communication via a cellular connection.

According to a fourth aspect of the present invention a network node is provided. The network node controls cellular radio resources of UEs in a cellular network at least configured to operate according to one radio access technology supporting local ad-hoc communication. The network node comprises a receiver configured to receive information from a UE about radio resource utilization resulting in resource restrictions due to a local communication which the UE intends to be involved in, and a controlling unit configured to control the cellular radio resources based on the received information.

According to an embodiment, the cellular network is configured to operate according to multiple radio access technologies and in this embodiment the information comprises recommendations that the UE should not be handed over to certain radio access technologies.

According to a further embodiment, the network node is a core network node, such as a VLR or HLR, and the core network node comprises a profile storage storing at least one profile comprising the information about radio resource utilization resulting in resource restrictions associated with possible UE local ad-hoc configurations.

According to a yet further embodiment, the network node is a radio access network node, wherein the receiver may be configured to receive a local communication request from the UE. The local communication request comprises information about radio resource restrictions associated with possible UE local ad-hoc configurations.

An advantage with embodiments of the present invention is that the proposed solution enables multi-RAT cellular networks to avoid issuing such commands to UEs that are involved in cellular and ad-hoc communications that would lead to conflicts and thereby (possibly) leading to communication failure or performance degradations of the ad-hoc communication sessions.

A further advantage with embodiments of the present invention is that the proposed solution builds mostly on already standardized and implemented protocols and other technology components. For instance, the profile that is used in the NAS (non access stratum) based solution can be an extension of the existing Subscriber Profile.

BRIEF DESCRIPTION OF THE DRAWINGS

FIGS. 4-11 are flowcharts of the methods according to the embodiments of the present invention.

FIGS. 13 and 14 show the network node according to embodiments of the present invention.

DETAILED DESCRIPTION

Figure 1:
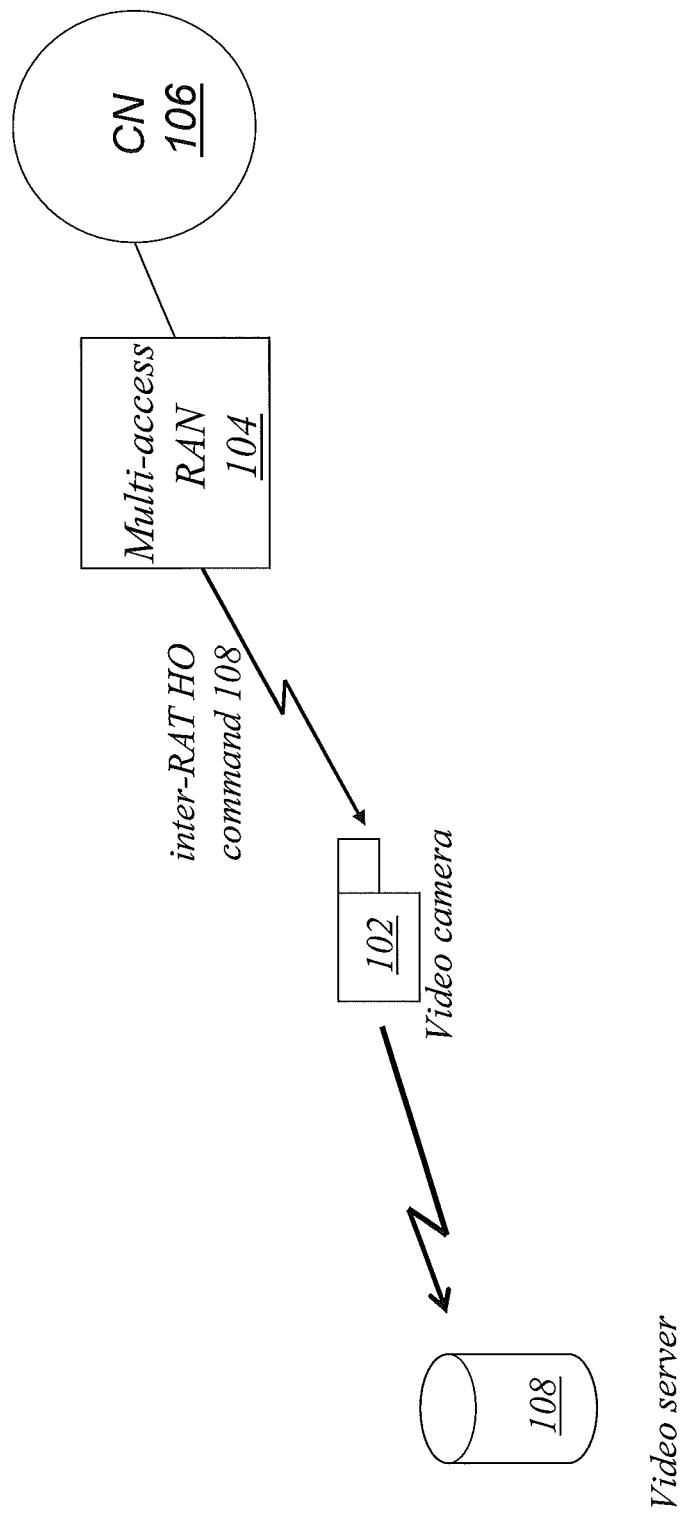
FIG. 1 illustrates a network setup wherein the embodiments of the present invention may be used.

The present invention will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

The present invention is applicable to radio access technologies allowing both cellular and local ad-hoc communication. Although such radio access technologies are exemplified by an LTE (Long Term Evolution) network, the present invention is not limited to LTE networks but can also be used in other networks.

In the embodiments of the present invention, it is being assumed that a user equipment (UE) equipped with one or more radio access technology (RAT) interfaces to a respective cellular network is part of one cellular communication session and of a local ad-hoc network session simultaneously using the same resources for the cellular and the local ad-hoc communication. Such a scenario may be supported by different existing technologies e.g. LTE and Wimax using for example, time or frequency sharing between accessing the cellular network and the local ad-hoc network or peers. The UEs may be restricted to only use one RAT interface at a time due to user preferences, physical or battery limitations or other reasons. This is a typical scenario for today's cellular phones supporting multiple 3GPP RAT interfaces (LTE, 3G, GSM/EDGE RAN).

Turning now to FIG. 1 which illustrates a scenario where a video camera 102 i.e. the UE is connected to a cellular network comprising radio access networks 104 and a core network 106 and is simultaneously participating in a local ad-hoc session with a video server 100. LTE resources are used for both the cellular, also referred to as global connection, and the ad-hoc, also referred to as local or local ad-hoc, connection. However, in this scenario the video camera 102 supports multiple RATs and can thus establish cellular connections with multiple access networks, e.g. with an LTE network and a 3G network. It should be noted that a cellular connection with only one of the supported RATs can be established at a time. However, the video camera can only establish the ad-hoc session with the video server via LTE.

The cellular network controls the UE in many aspects but is not aware of any local communication which the UE may be a part of. Therefore, the network may request the UE to perform an inter RAT handover 108, i.e. change from one RAT to another. If the video camera 102 in FIG. 1 would change from LTE to 3G which does not support ad-hoc communication, the ad-hoc session with the video server would fail.

The problem which embodiments of the present invention solve, stems from the combination of the facts that:
(1) the video camera shares some of its resources between the local and the cellular communication session,
(2) the cellular RAN is not aware of the UE, in this scenario the video camera, being engaged in a local session and
(3) the cellular network controls some of the resource assignments for the UE.

Accordingly, the RAN 104 or the core network 106 can order the UE 102 to execute a multi-access handover from LTE to 3G due to load balancing or operator policies in the scenario illustrated in FIG. 1.

As mentioned above, the embodiments of the present invention is applicable to a user equipment communicating locally with ad-hoc peers and with a cellular RAN using a single RAT at a time, wherein the RAT is used for both the local and the cellular communication sessions. Time or frequency division is used to differentiate between the local and the cellular sessions. In a scenario as illustrated in FIG. 1, prior to establishing a local ad-hoc communication channel, the UE needs to announce its own capabilities, detect/search local beacon signals, announcements and capabilities, e.g. it needs to find the video server, send and reply to so called HELLO messages, etc to the ad-hoc peer. Because the UE needs to act "on its own" without the cellular RAN's control when establishing the local ad-hoc sessions, the UE's resources are prone to get into conflicts between the ad-hoc and cellular communications.

Examples of such conflicts are:

Inter-RAT handover as mentioned above.

The UE may miss scheduling grants from the RAN while searching for the video server or establishing initial contact with it (e.g. exchanging security keys, etc);

The RAN may cause high interference to a local UE announcement, beacon signals, and HELLO messages since the RAN is not aware of the time/frequency resources the UE uses for local capability announcements and signaling.

The above mentioned conflicts can be resolved by informing the cellular network consisting of a core network and one or more radio access networks about radio resource management restrictions due to the local ad-hoc communication needs and resources that are reserved for local ad-hoc communications. For example, in the inter-RAT handover example as described above, the UE indicates proactively to the CN that it cannot perform inter-RAT handover because its ad-hoc peer is not multi-RAT capable.

Accordingly, both the CN and the RAN should be made aware of the local communication needs of the UE according to embodiments of the present invention. Clearly, the source of the information concerning the local communication needs of the UE is the UE, since it is the UE that initiates the ad-hoc communications and has information about the local communication requirements. Thus, according to embodiments of the invention the UE sends information to the network about radio resource utilization resulting in restrictions due to the ad-hoc communication. This information may comprise:

Information of the RAT, e.g. LTE, used for local communication which may be interpreted as a suggestion to the network that the UE should not be handed over to another RAT than LTE.

Informing the network that the UE is not able to receive scheduling grants from the RAN since it is busy searching for establishing initial contact with local communication devices.

Informing the network about time/frequency resources used for the local communication so as to assist the cellular RAN in avoiding causing interference to the local communication links;

Other parameters associated with the local communication such as maximum and typical power that is used for local communication (e.g. in Bluetooth this could be 1 mW or 100 mW) and the frequency bandwidth that will be used for the local communication.

According to a first embodiment, the UE uses the non access stratum (NAS) level to send such information to the core network and then forward the information to the radio access network. According to a second embodiment, the UE uses the access stratum (AS) level to send such information to the radio access network and this information is then forward to the radio access network.

Figure 2A:
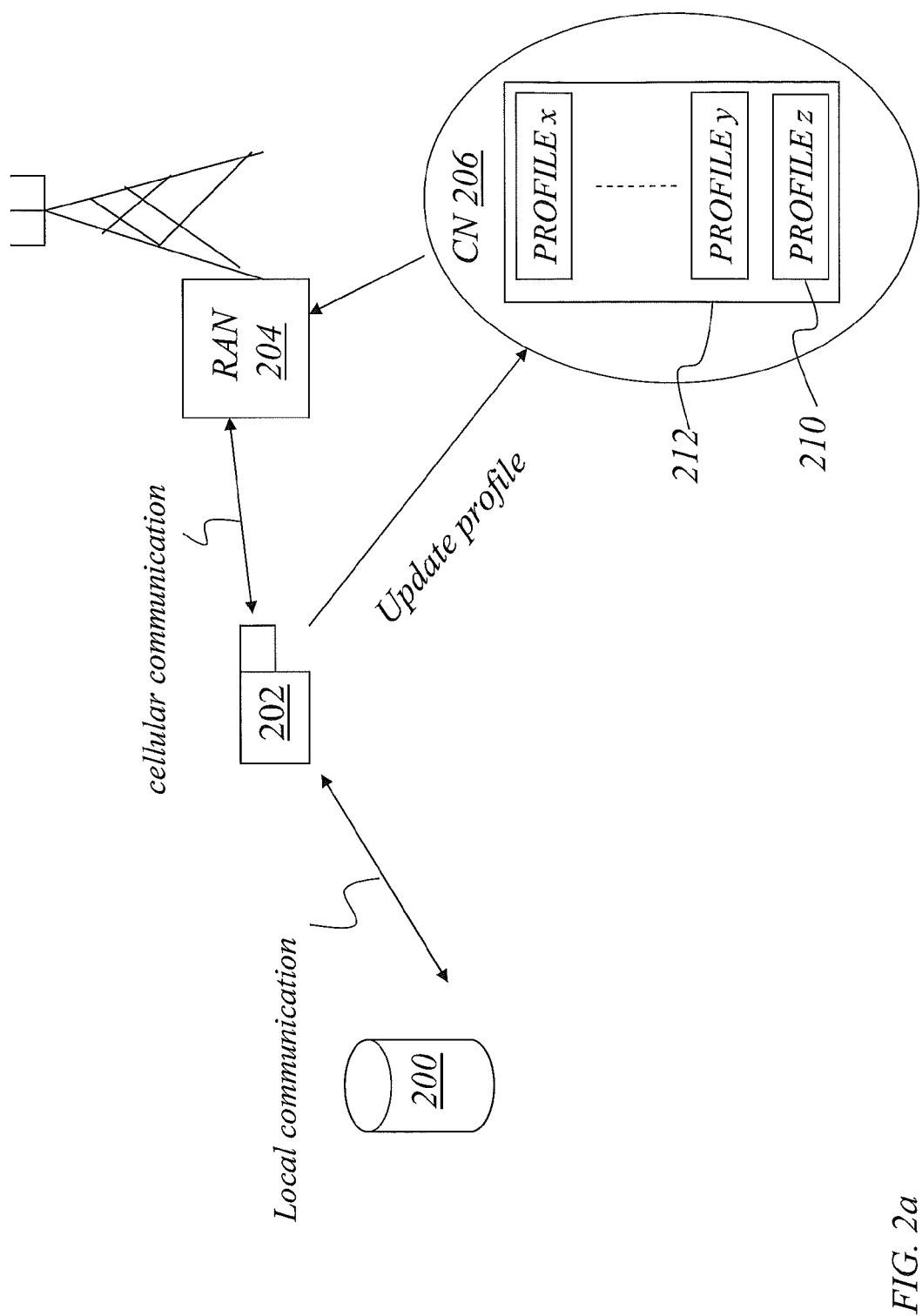
FIGS. 2a and 2b illustrate a first embodiment of the present invention using a NAS (non access stratum) based solution.

Turning now to FIG. 2a illustrating a NAS scenario corresponding to the scenario of FIG. 1, where the video camera supports multiple radio interfaces (LTE, 3G and GSM), but it can only use one of the radio interfaces at any one point in time. The video server has only one radio interface supporting local ad-hoc communication such as an LTE interface and the cellular network comprises multiple RANs supporting e.g. GSM, 3G and LTE.

The UE, the video camera 202 connects to the cellular network 204,206 and locally ad-hoc to the video server 200.

It uses frequency or time division to be able to communicate with the video server locally and with the cellular radio access network simultaneously.

Figure 2B:
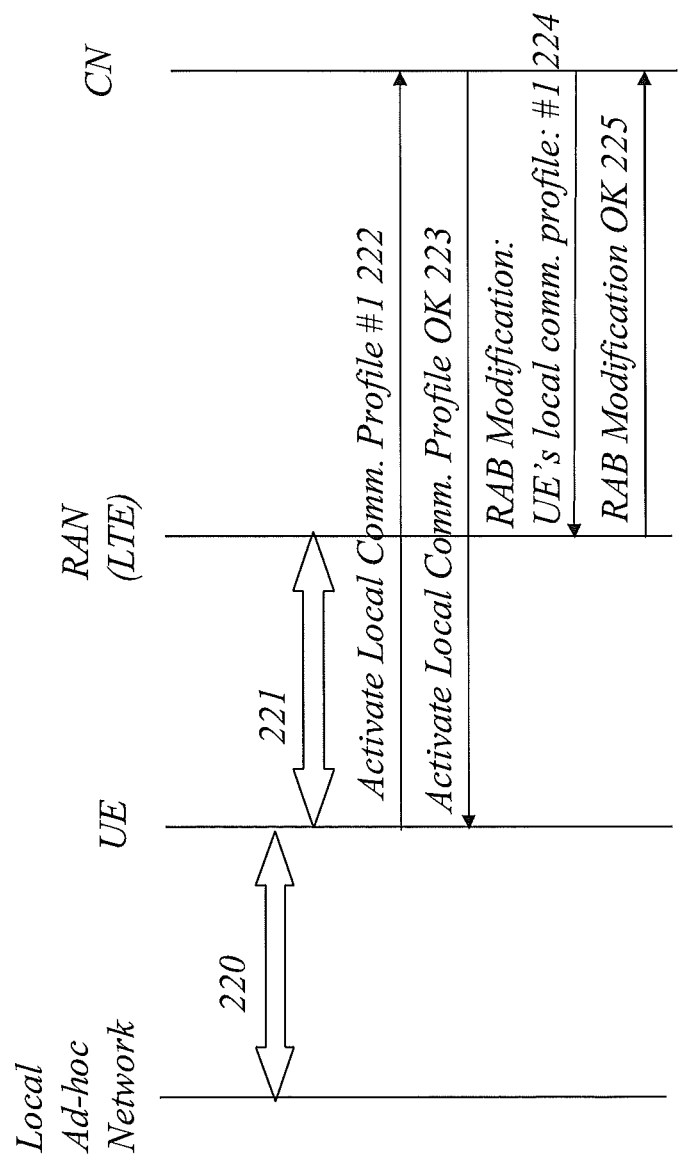

In the NAS based solution the UE registers in the home location register (HLR) 212 which is a part of the core network 206. According to the first embodiment, the UE 202 registers with multiple profiles 210 and updates its current profile as illustrated in FIG. 2a. Each such profile 210 contains a set of user preferences that contain information about radio resource restrictions due to the ad-hoc communication, i.e. about the various scenarios and associated resource requirements or preferences that the UE would like the CN and the RAN(s) to know about. For example, in a UE profile referred to as "Local LTE communication", the UE may indicate that it is engaged in an ad-hoc session with devices that are only LTE capable and that the UE cannot execute an inter-RAT handover. The profile may also comprise type of local communication, intensity level, QoS parameters and importance (priority). The priority refers to the relevance of the local communication relative to the cellular communication sessions. For example, if this priority level is set HIGH, that means that the UE does not want to RAN to interrupt or interfere with any local communication session. On the contrary, if this priority is set LOW, the UE accepts that the RAN interferers with or interrupts the local communication session in case, for example, an incoming cellular communication session. The UE may however still be able to use different bands with LTE spectrum. In this way, the network obtains information whether a certain inter-RAT handover is acceptable or not or how to schedule scheduling grants for example. The NAS based solution according to the first embodiment is further illustrated in FIG. 2b. When the UE starts 220 a local communication session and establishes 221 signaling bearers, it activates 222 a local communication profile to the HLR or the VLR of the core network by sending a PROFILE UPDATE (NAS) command to the HLR or VLR. For example, this update command may be PROFILE UPDATE to "Local LTE communication" which implies that the UE should not be handed over to another RAT than LTE. The core network responds with an OK or not OK message to confirm 223 the received profile. When the core network receives this update command, it distributes this information to relevant CN nodes (e.g. SGSN) such that state of the art inter-RAT traffic steering and handover algorithms can take the current profiles into account. The CN also sends 224 a RAB MODIFICATION message to the current serving RAN, so that the RAN RRM algorithms can be made aware of the UE communicating in parallel in a local ad-hoc network. As shown in FIG. 2b, the RAN responds 225 to the RAB modification. The RAN scheduling algorithm can now take into account that the UE is engaged in local communication. The RAN can also be preconfigured such that it knows which OFDM (Orthogonal Frequency Division Multiplex) resource blocks the UE uses for local communication and these resource blocks will not be used by the RAN. The RAN may be preconfigured by the O&M (Operation and Maintenance) system such that it does not use certain resources that can be used for local communication purposes. In a bit more advanced solution, the RAN is preconfigured, but it starts refraining from those preconfigured resources when the UE sends a TRIGGER REQUEST to the RAN.

Figure 3A:
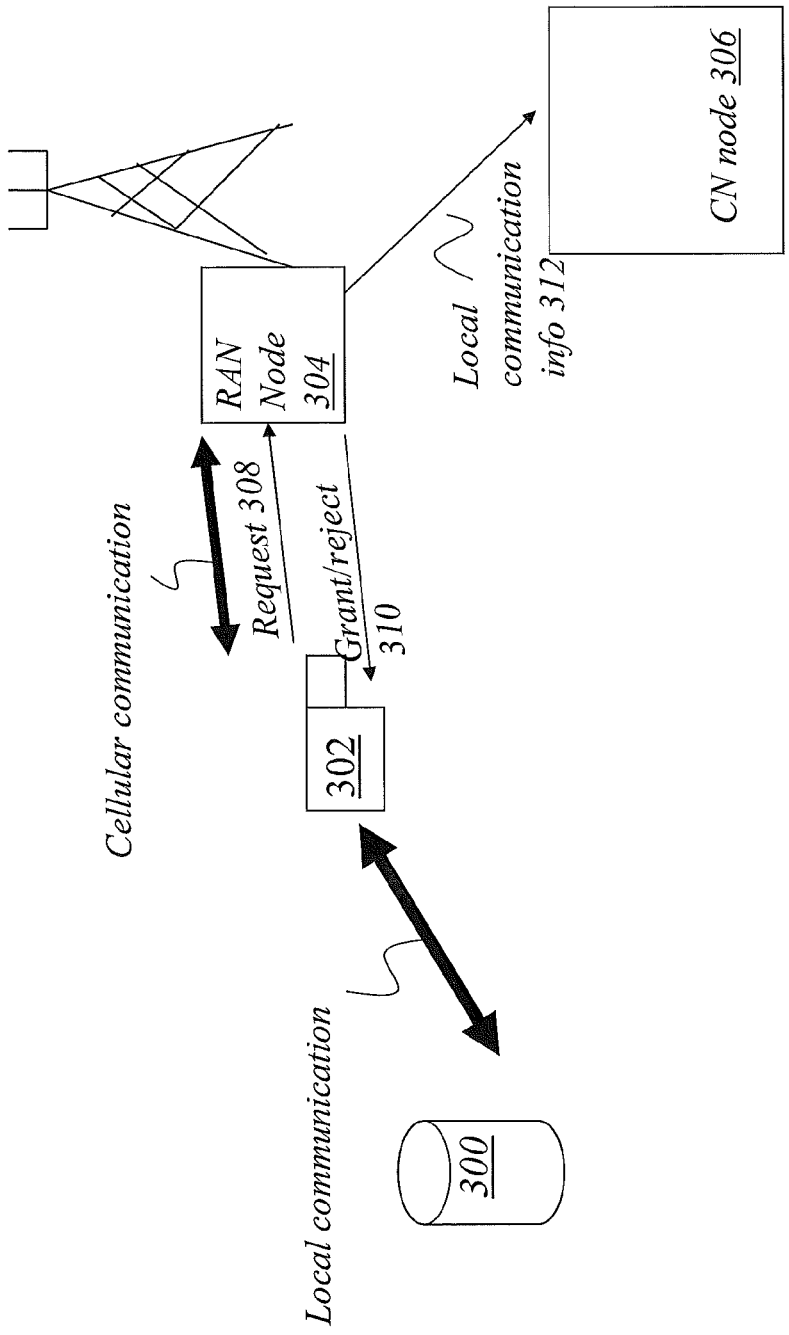
FIGS. 3a and 3b illustrate a second embodiment of the present invention using an AS (access stratum) based solution.

Turning now to FIG. 3a illustrating an AS scenario corresponding to the scenario of FIG. 1, where the video camera supports multiple radio interfaces (LTE, 3G and GSM), but it can only use one of the radio interfaces at any one point in time as in NAS scenario. Further, similar to the NAS scenario the video server has only one radio interface supporting local ad-hoc communication such as an LTE interface and the cellular network comprises multiple RANs supporting e.g. GSM, 3G and LTE.

The UE, the video camera 302 connects to the RAN 304 and the CN 306 and establishes a local ad-hoc communication with the video server 300. It uses frequency or time division to be able to communicate with the video server locally and the cellular radio access network simultaneously.

In the AS based solution the UE 302 the video camera in this case sends 308 a "LOCAL COMMUNICATION" request to its current serving RAN 304 using RRC (radio resource control) signaling. This request contains parameters about the type of local communication, intensity level, QoS parameters and importance, also referred to as priority. The priority refers to the relevance of the local communication relative to the cellular communication sessions in a similar way as the NAS based solution. The RAN responds 310 with a "LOCAL COMMUNICATION GRANT" or "LOCAL COMMUNICATION REJECT" AS message to the UE. From the RAN perspective, granting a local communication session that implies resource restrictions to the RAN is similar to the regular type of admission control. That is, the purpose of the local admission control is to ensure that after granting the session, and respecting the resource restrictions, the RAN must have enough remaining resources to maintain the QoS of already ongoing sessions. So in its simplest form, the RAN takes into account the priority level of the local communication as requested by the UE and the amount of resources, e.g. OFDM resource blocks, that are affected if the local communication session gets accepted and considers these resources as input into its state-of-the art admission control algorithm. The difference from regular admission control is that the output of this admission control is now applied to the local communication session rather than to the regular radio access bearer request.

In the case of grant, the grant message contains information elements about recommendations to the UE about which time and frequency resources it should use for its local communication needs. In this case, the RAN also informs 312 the core network "UE IN LOCAL COMMUNICATION" (which may be an extension of the RAB modification) that the UE is involved in local ad-hoc communication. The core network thereafter tries to avoid sending commands to the UE which may cause a conflict to an on-going local communication session, such as an inter-RAT handover to the UE taking into account the importance parameter in the "LOCAL COMMUNICATION" request. Further, the RAN refrains to use those time/frequency resources that were recommended for the UE in the "LOCAL COMMUNICATION GRANT" message.

Figure 3B:
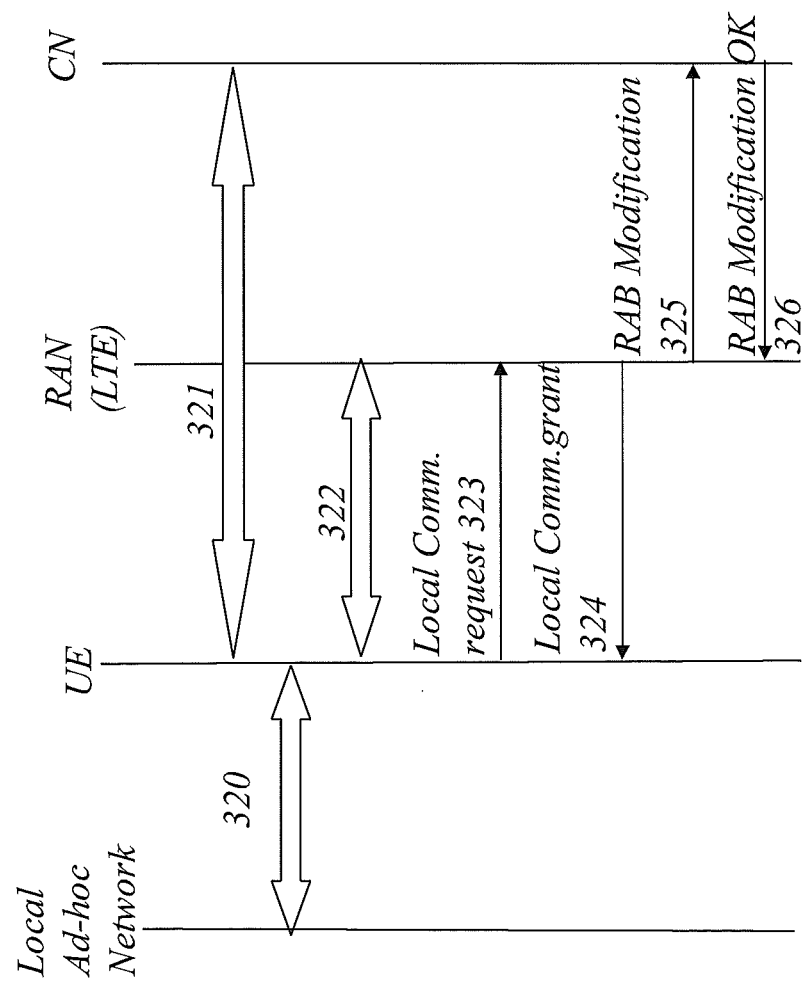

The AS based solution according to the second embodiment is further illustrated in FIG. 3b. When the UE has established 320 a local communication session and established radio 321 and signaling 322 bearers to the cellular network, it sends 323 a "LOCAL COMMUNICATION" request to the serving RAN using RRC signaling. It should be noted that establishing a communication with the local device (as shown in 320) may only imply that the devices have achieved some basic synchronization of the physical layer and exchanged identities. In other words, they have established a control plane association effectively corresponding to a signaling bearer. Before they can start using the user data plan, the UE sends the "LOCAL COMMUNICATION" request to the cellular network.

The request comprises information to the network about radio resource utilization resulting in restrictions due to the local communication such as parameters corresponding the parameters of the profiles according to the NAS based solution e.g. type of local communication, intensity level, QoS parameters and importance (priority).

The RAN responds 324 with a "LOCAL COMMUNICATION GRANT" or "LOCAL COMMUNICATION REJECT" AS message to the UE. In the case of grant, the grant message contains information elements about recommendations to the UE about which time and frequency resources it should use for its local communication needs.

If the request is granted, the RAN also informs 325 the core network in a "UE IN LOCAL COMMUNICATION" message that the UE is involved in local (ad-hoc) type of communication. The "UE IN LOCAL COMMUNICATION" message may be an extension of the existing RAB modification message, wherein the core network can respond 326 to the RAB modification with a RAB modification OK/not OK. The network can then take the local communication into account when controlling the cellular resources of the UE. That may result in that the core network thereafter tries to avoid sending an inter-RAT handover to the UE if the UE has an active local communication session.

It should be noted that the AS based solution is more applicable for a more dynamic usage to update the current RAN regarding fast RRM (Radio Resource Management) restrictions, whereas the NAS based solution can advantageously be used to influence core network related algorithms e.g. load balancing, traffic steering, etc.

To summarize, a method in a UE is proposed according to embodiments of the present invention. The UE comprises at least one radio access communication interface supporting cellular and local ad-hoc communication. As illustrated in FIG. 4, the method comprises according to one embodiment establishment 401 of a cellular communication to the cellular network if there is no existing on-going session. A local communication to the ad-hoc network is then established 402 implying that the devices involved in the local communication has achieved a basic synchronization and that no user plane data is ready to be transmitted. Information about radio resource utilization resulting in resource restrictions for cellular communication due to the local ad-hoc communication is sent 403 to a network node such that the network i.e. the RAN and the core network can take the characteristics of the local communication into account when allocating radio resources for the cellular communication.

As mentioned above, the UE and the RAN may support multiple RATs. In this case the UE comprises at least a first communication interface for a first cellular network configured according to a first RAT and a second communication interface for a second cellular network configured according to a second radio access technology, wherein only one of the first and second communication interfaces can be used at one point of time. The information may comprise recommendations that the UE should not be handed over to certain radio access technologies which is not supported by the local device.

According to the first embodiment, the UE sends the information to the network according to a NAS based solution, as illustrated in FIG. 5 where the UE sends 403a the information to a core network node in the cellular network. The sending step 403a may comprise an updating 403a1 of a UE profile stored at the core network node with information associated with the established local communication as illustrated in FIG. 6.

According to the second embodiment, the UE sends the information to the network according to an AS based solution, as illustrated in FIG. 7 where the UE sends 403b the information to a radio access node in the cellular network. The sending step 403b may comprise the further steps of sending 403b1 a local communication request at least containing parameters about characteristics of the local communication to the radio access network node and receiving 403b2 a local communication grant or a local communication reject in response to the local communication request as illustrated in FIG. 8. The local communication grant comprises information elements indicating which resources the UE should use for the local communication.

Furthermore, a method in a network node controlling cellular radio resources of UEs in a cellular network at least configured to operate according to one radio access technology supporting local ad-hoc communication is also provided. As illustrated in FIG. 9, the network node receives 601 information from a UE about radio resource utilization resulting in resource restrictions due to a local communication which the UE intends to be involved in and controls 602 the cellular radio resources based on the received information.

According to the first embodiment the network node is a core network node such as a HLR (Home location register) or VLR (Visiting Location Register) and the core network node is storing at least one profile comprising the information about radio resource restrictions associated with possible UE local ad-hoc configurations. In this case, the receiving step 601 comprises the further steps of receiving 601a1 a profile update command, and sending 601a2 a RAB modification message to a RAN serving the UE so that the RAN radio resource algorithms can be made aware of the ongoing local ad-hoc UE communication as illustrated in FIG. 10.

According to a second embodiment, the network node is a radio access node, wherein the receiving step comprises the further steps of receiving 601b1 a local communication request comprising the information about radio resource restrictions associated with possible UE local ad-hoc configurations, responding 601b2 with a local communication grant or a local communication reject, and if the local communication is granted informing 601b3 the core network about the local communication as illustrated in FIG. 11.

Figure 12:
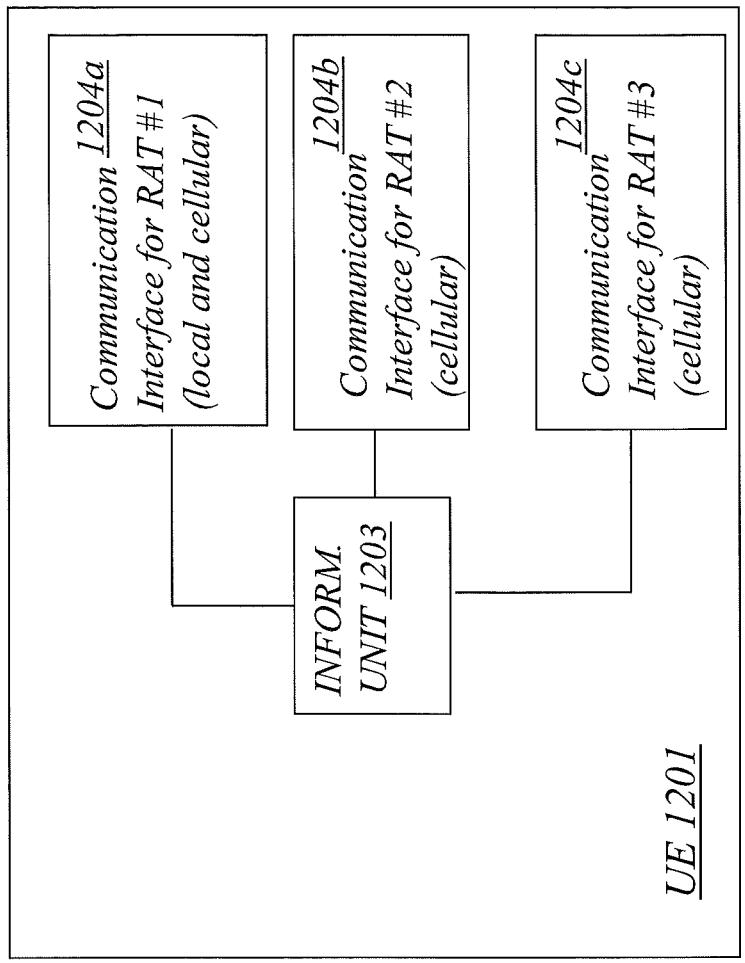
FIG. 12 shows the UE according to embodiments of the present invention.

The methods of the embodiments relates to one method in a UE and a corresponding method in a network node. A UE adapted to implement the UE method is shown in FIG. 12. The UE 1201 comprises at least one radio access communication interface 1204a supporting cellular and local ad-hoc communication. As mentioned above, the UE may also comprise multiple radio access communication interfaces 1204b, 1204c supporting other RATs wherein only one of the communication interfaces can be used at one point of time. Said at least one radio access communication interface 1204a is configured to establish a local communication to the ad-hoc network. According to the invention, the UE 1201 comprises an information unit 1203 configured to send, to a node of the cellular network, information about radio resource utilization resulting in resource restrictions for cellular communication due to the local ad-hoc communication via a cellular connection using one of the radio access communication interfaces.

A network node adapted to implement the network node method is shown in FIGS. 13 and 14. FIG. 13 illustrates the NAS based embodiment where the network node is a core network node and FIG. 14 illustrates the AS based embodiment where the network node is a radio access network node. Accordingly, the network node 206; 304 controls cellular radio resources of UEs in a cellular network at least configured to operate according to one radio access technology supporting local ad-hoc communication. The network node 206; 304 comprises a receiver 1302; 1402 configured to receive information 1304; 1404 from a UE about radio resource utilization resulting in resource restrictions due to a local communication which the UE intends to be involved in. Furthermore, the network node comprises a controlling unit 1306; 1403 configured to control the cellular radio resources based on the received information.

According to the first embodiment, the network node 206 is a core network node 206 such as a VLR or HLR. The core network node comprises a profile storage 1301 storing at least one profile comprising the information about radio resource utilization resulting in resource restrictions associated with possible UE local ad-hoc configurations.

Furthermore, the receiver 1302 is configured to receive a profile update command 1304, and the network node 206 further comprises a transmitter 1303 configured to send a RAB modification message 1305 to a RAN serving the UE so that the RAN radio resource algorithms can be made aware of the ongoing local ad-hoc UE communication.

According to the second embodiment, the network node 206 is a radio access network node 304, wherein the receiver 1402 of the radio access network node 304 is configured to receive a local communication request 1404 comprising the information about radio resource utilization resulting in resource restrictions associated with possible UE local ad-hoc configurations. The radio access network node further comprises a transmitter 1405 configured to respond with a local communication grant or a local communication reject 1406 to the UE, and to inform 1405 the core network about the local communication.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method in a User Equipment, UE, comprising at least one radio access communication interface supporting cellular and local ad-hoc communication, the method comprising:
    establishing a local communication to an ad-hoc network; and
    sending via a cellular connection, to a node of a cellular network, information about radio resource utilization resulting in resource restrictions for cellular communication due to the local ad-hoc communication,
    wherein the UE comprises at least a first communication interface for a first cellular network configured according to a first radio access technology, RAT, and a second communication interface for a second cellular network configured according to a second RAT, the method further comprising operating only one of the first and second communication interfaces at any time, and
    wherein the information about radio resource utilization resulting in resource restrictions for cellular communication due to the local ad-hoc communication comprises recommendations that the UE should not be handed over to certain radio access technologies.

2. The method according to claim 1, wherein the information about radio resource utilization resulting in resource restrictions for cellular communication due to the local ad-hoc communication comprises at least one of type of local communication, intensity level, quality of service parameters and priority.

3. The method according to claim 1, wherein sending the information comprises:

sending the information to a core network node in the cellular network.

4. The method according to claim 3, wherein sending the information comprises:
updating a UE profile stored at the core network node using the information associated with the established local ad-hoc communication.

5. The method according to claim 1, wherein sending the information comprises:
sending the information to a radio access network node in the cellular network.

6. The method according to claim 5, wherein sending the information comprises:
sending a local communication request that at least contains parameters for characteristics of the local communication to the radio access network node.

7. The method according to claim 5, wherein the method comprises:
receiving a local communication grant or a local communication reject in response to the local communication request,
wherein the local communication grant comprises information elements indicating which resources the UE should use for the local communication.

8. A method in a network node controlling cellular radio resources of User Equipments, UEs, in a cellular network at least configured to operate according to one radio access technology supporting local ad-hoc communication, the method comprising:
receiving information from a UE about radio resource utilization resulting in resource restrictions due to a local communication which the UE intends to be involved in; and
controlling the cellular radio resources based on the received information,
wherein the cellular network is configured to operate according to multiple radio access technologies, and
wherein the information comprises recommendations that the UE should not be handed over to certain radio access technologies.

9. The method according to claim 8, wherein the information about radio resource utilization resulting in resource restrictions due to the local ad-hoc communication comprises at least one of type of local communication, intensity level, quality of service parameters and priority.

10. The method according to claim 8,
wherein the network node is a core network node; and
wherein the core network node stores at least one profile comprising the information about radio resource utilization resulting in resource restrictions associated with possible UE local ad-hoc configurations.

11. The method according to claim 10, wherein the core network node is a home location register or a visitor location register.

12. The method according to claim 10, wherein receiving the information comprises:
receiving a profile update command; and
sending a RAB modification message to a radio access network, RAN, serving the UE so that the RAN radio resource algorithms can be made aware of the ongoing local ad-hoc UE communication.

13. The method according to claim 8, wherein the network node is a radio access network node.

14. The method according to claim 13, wherein receiving the information comprises:
receiving a local communication request comprising the information about radio resource utilization resulting in resource restrictions associated with possible UE local ad-hoc configurations;
responding with a local communication grant or a local communication reject; and
when the local communication is granted, informing the CN about the local communication.

15. A User Equipment, UE, comprising:
at least one radio access communication interface supporting cellular and local ad-hoc communication, said at least one radio access communication interface is configured to establish a local communication to an ad-hoc network;
an information unit configured to send via a cellular connection, to a node of a cellular network, information about radio resource utilization resulting in resource restrictions for cellular communication due to the local ad-hoc communication;
at least a first communication interface for a first cellular network configured according to a first radio access technology, RAT; and
a second communication interface for a second cellular network configured according to a second RAT,
wherein only one of the first and second communication interfaces can be used at any time, and
wherein the information about radio resource utilization resulting in resource restrictions due to the local ad-hoc communication comprises recommendations that the UE should not be handed over to certain radio access technologies.

16. The UE according to claim 15, wherein the information about radio resource utilization resulting in resource restrictions due to the local ad-hoc communication comprises at least one of type of local communication, intensity level, quality of service parameters and priority.

17. The UE according to claim 15, wherein the information unit is configured to send the information to a core network node in the cellular network.

18. The UE according to claim 17, wherein the information unit is configured to update a UE profile stored at the core network node with information associated with the established local communication.

19. The UE according to claim 15, wherein the information unit is configured to send the information to a radio access network node in the cellular network.

20. The UE according to claim 19, wherein the information unit is configured to send a local communication request that at least contains parameters for characteristics of the local communication to the radio access network node.

21. A network node controlling cellular radio resources of User Equipments, UEs, in a cellular network that is at least configured to operate according to one radio access technology supporting local ad-hoc communication, the network node comprising:
a receiver configured to receive information from a UE about radio resource utilization resulting in resource restrictions due to a local communication which the UE intends to be involved in; and
a controlling unit configured to control the cellular radio resources based on the received information,
wherein the receiver is configured to operate according to multiple radio access technologies, and
wherein the information comprises recommendations that the UE should not be handed over to certain radio access technologies.

22. The network node according to claim 21, wherein the information about radio resource utilization resulting in resource restrictions due to the local ad-hoc communication comprises at least one of type of local communication, intensity level, quality of service parameters and priority.

23. The network node according to claim 21,
wherein the network node is a core network node, and
wherein the core network node comprises a profile storage storing at least one profile comprising the information about radio resource utilization resulting in resource restrictions associated with possible UE local ad-hoc configurations.

24. The network node according to claim 23, wherein the core network node is a home location register or a visitor location register.

25. The network node according to claim 23, wherein the receiver is configured to receive a profile update command, and the network node further comprises a transmitter configured to send a RAB modification message to a radio access network, RAN, serving the UE so that the RAN radio resource algorithms can be made aware of the ongoing local ad-hoc UE communication.

26. The network node according to claim 21, wherein the network node is a radio access network node.

27. The network node according to claim 26,
wherein the receiver is configured to receive a local communication request, comprising the information about radio resource utilization resulting in resource restrictions associated with possible UE local ad-hoc configurations, from the UE, and
wherein the network node further comprises a transmitter configured to respond with a local communication grant or a local communication reject to the UE, and to inform the core network about the local communication.

28. The method of claim 1, wherein sending the information about radio resource utilization resulting in resource restrictions for cellular communication due to the local ad-hoc communication comprises sending, from the UE to the node of the cellular network, an indication that the local communication has a higher priority level than the cellular communication.

* * * * *

UNITED STATES PATENT AND TRADEMARK OFFICE
CERTIFICATE OF CORRECTION

PATENT NO. : 9,198,211 B2  
APPLICATION NO. : 13/008575  
DATED : November 24, 2015  
INVENTOR(S) : Fodor et al.

Page 1 of 1

It is certified that error appears in the above-identified patent and that said Letters Patent is hereby corrected as shown below:

In the Drawings

In Fig. 1, Sheet 1 of 10, delete " 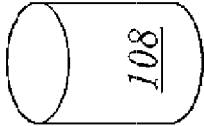 " and insert -- 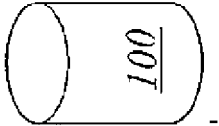 --, therefor.

In the Specification

In Column 4, Line 48, delete "session" and insert -- session, --, therefor.

In Column 5, Line 8, delete "etc);" and insert -- etc). --, therefor.

Signed and Sealed this  
Sixteenth Day of August, 2016

Michelle K. Lee  
*Director of the United States Patent and Trademark Office*